(12) United States Patent
Fluman et al.

(10) Patent No.: US 10,169,948 B2
(45) Date of Patent: Jan. 1, 2019

(54) PRIORITIZING STORAGE OPERATION REQUESTS UTILIZING DATA ATTRIBUTES

(71) Applicant: INTERNATIONAL BUSINESS MACHINES CORPORATION, Armonk, NY (US)

(72) Inventors: Mudi M Fluman, Haifa (IL); Yaacov Frank, Ramot Meir (IL); Janice M Girouard, Austin, TX (US); Yehuda Shiran, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 14/170,227

(22) Filed: Jan. 31, 2014

(65) Prior Publication Data
US 2015/0220463 A1 Aug. 6, 2015

(51) Int. Cl.
G06F 3/06 (2006.01)
G07F 17/00 (2006.01)
G06Q 20/08 (2012.01)
G06F 13/18 (2006.01)

(52) U.S. Cl.
CPC .......... *G07F 17/0021* (2013.01); *G06F 3/061* (2013.01); *G06F 3/067* (2013.01); *G06F 3/0659* (2013.01); *G06Q 20/0855* (2013.01); *G06F 13/18* (2013.01)

(58) Field of Classification Search
None
See application file for complete search history.

(56) References Cited

U.S. PATENT DOCUMENTS

| | | | |
|---|---|---|---|
| 6,301,639 B1 * | 10/2001 | Cleavinger | G06F 3/0611 710/6 |
| 6,587,433 B1 | 7/2003 | Borella et al. | |
| 6,944,128 B2 | 9/2005 | Nichols | |
| 6,944,166 B1 | 9/2005 | Perinpanathan et al. | |

(Continued)

OTHER PUBLICATIONS

Ghandeharizadeh, Shahram et al., "A Cost Driven Disk Scheduling Algorithm for Multimedia Object Retrieval," IEEE Transactions on Multimedia, vol. 5.2, 2003, pp. 186-196.

(Continued)

*Primary Examiner* — Brian R Peugh
(74) *Attorney, Agent, or Firm* — Griffiths & Seaton PLLC

(57) ABSTRACT

Storage operation requests from any device of a computing environment can be numerous and frequent. In particular, if there is a high frequency initiation of storage operation requests to store, retrieve, or modify data, then targeted storage systems have to easily and quickly decide in which order to satisfy the storage operation requests, such as when two requests occur to retrieve identical data. Storage operation requests can be prioritized at the end device instead of any intermediary device or enabling a complex ordering algorithm. Moreover, the storage on a cloud model consists of similar storage services which serve consumers of different needs. Some applications/users can afford longer service time than other applications/users. Differentiation in required service time allows price differentiation. The solution will serve premium customers faster than it serves customers who paid less.

19 Claims, 6 Drawing Sheets

(56) References Cited

U.S. PATENT DOCUMENTS

| | | | |
|---|---|---|---|
| 7,480,754 B2* | 1/2009 | Priborsky | G06F 3/0605 |
| | | | 710/112 |
| 7,573,819 B2 | 8/2009 | Krzanowski et al. | |
| 8,223,642 B2 | 7/2012 | Curry et al. | |
| 2003/0097443 A1 | 5/2003 | Gillett et al. | |
| 2004/0039803 A1 | 2/2004 | Law | |
| 2005/0076154 A1* | 4/2005 | Chambliss | H04L 67/1097 |
| | | | 710/1 |
| 2008/0244590 A1* | 10/2008 | Chambliss | H04L 41/0893 |
| | | | 718/102 |
| 2011/0246665 A1 | 10/2011 | Vange et al. | |
| 2014/0129744 A1* | 5/2014 | Muppirala | H04L 47/6275 |
| | | | 710/39 |

OTHER PUBLICATIONS

Radhika, T. V. et al., "Resource Allocation Model for Efficient Management in Cloud Computing," International Journal on Advanced Computer Theory and Engineering (IJACTE), vol. 2, Issue 4, 2013, pp. 63-71.

* cited by examiner

PRIORITIZING STORAGE OPERATION REQUESTS UTILIZING DATA ATTRIBUTES

FIELD OF THE INVENTION

The present invention relates generally to the field of storage systems and particularly, a system and methodology for satisfying storage system requests based on service levels.

BACKGROUND OF THE INVENTION

Conventionally, a storage system receives requests to store, retrieve, and modify data from various sources. For example, a first device can request that a word processing file be stored on a storage system. A second device can request to read a previously stored web-formatted file, such as HTML, and display it on the requesting device's display. As devices that produce storage operation requests proliferate, sometimes with multiple requests originating from the same device, it is difficult to choose which request to satisfy. Prior solutions include satisfying the first request to be received by the storage system and subsequently creating a queue of incoming requests. Alternatively, the requests may be collected and sorted by a network router or gateway for prioritization before the storage system satisfies the storage operation request. These solutions however, incur processing and hardware overhead when managing the prioritization of the storage operation requests. There is a need to be able to differentiate and satisfy storage operation requests with a simple and efficient mechanism.

SUMMARY

Embodiments of the present invention disclose a method, system and computer program product for prioritizing storage operation requests. The method includes at least one processor creating a storage operation request, such that the storage operation request may be originated by an initiator and transmitted to a target. Further, at least one processor identifies a priority value for the storage operation request, such that the priority value may be associated with a request of the initiator. Moreover, at least one processor receives the storage operation request at the target, such that the target selects at least one storage operation request from the storage operation requests based on a highest priority value. Subsequently, at least one processor of the target satisfies the storage operation request having the highest priority value.

DETAILED DESCRIPTION

Sometimes, storage operation requests from any device of a computing environment are numerous and frequent. In particular, if there is a high frequency need to store, retrieve, or modify data, then recipient storage systems have to easily and quickly decide in which order to satisfy storage operation requests, such as when two requests occur to retrieve identical data. The solution is to prioritize storage operation requests at the end device instead of any intermediary device or enabling a complex ordering algorithm. Specifically, there can exist defined service levels assigned to various users, applications, computing devices, or the like, that initiate storage operation requests. By creating service levels that can be quickly identified by the storage end device, such as a Hard Disk Drive (HDD), Solid-State Device (SSD), or the like, a high priority level identifier associated with one operation request can be quickly distinguished from a lower priority level identifier associated with a second storage operation request.

The storage on a cloud model consists of similar storage services which serve consumers of different needs. Some applications/users can afford longer service time than other applications/users. Differentiation in required service time allows price differentiation. The hereinafter described system and method will serve premium customers faster than it serves customers who paid less. Examples of some embodiments describing such differentiation in storage service time follows.

Figure 1:
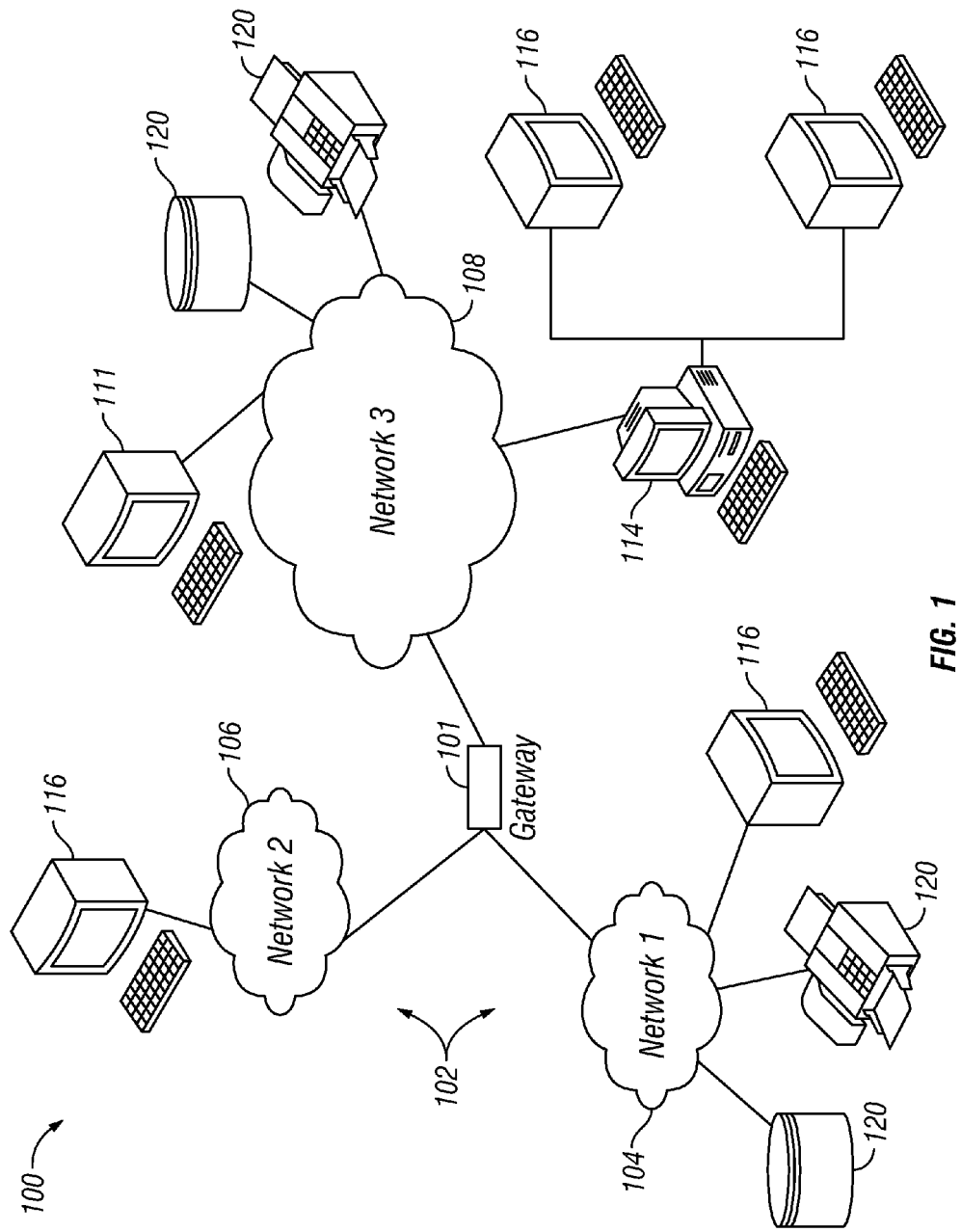
FIG. 1 depicts a representative network environment, in accordance with an embodiment of the present invention.

For example, FIG. 1 depicts a representative network environment, in accordance with an embodiment of the present invention. Within the network environment exist various computing devices that implement a solution for prioritizing storage operation requests. It should be appreciated by one of ordinary skill in the art that the following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

At a high level, the following description discloses several preferred embodiments of systems, methods and computer program products that identify a data storage device such as a disk, disks, or other storage media in a storage system that are deemed to handle at least one storage operation request. For simplicity if there are two storage operation requests, then the solution described herein can be used to distinguish which storage operation request to handle first. By default, even a single storage operation request can function within the contours of the hereafter described solution.

In one general embodiment, a method implemented by a computing device, such as a computer, includes communicating with a plurality of data storage end devices. Data is caused to be stored on first ones of the data storage end devices. A backup copy of the data may be stored/replicated on the first and/or on second ones of the data storage end devices. In another general embodiment, a system includes a manager configured to communicate with a plurality of data storage end devices. The manager includes hardware for communicating with the plurality of data storage end devices, and logic configured to perform various steps of the foregoing method. In another embodiment, a computer program product includes a computer readable storage medium having program code embodied therewith, the program code readable/executable by a processor to perform, by the processor, various steps of the foregoing method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Further, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures of this document illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network environment 100, in accordance with one embodiment. A plurality of remote networks 102 are provided including a first remote network 104 and a second remote network 106. A gateway 101 may be coupled between the remote networks 102 and a proximate network 108. In the context of the present network environment 100, the networks 104, 106 may each take any form including, but not limited to a LAN, a WAN such as the Internet, Virtual Private Network (VPN), public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, mobile computing device, printer or any other type of computing device. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element, may refer to any component of a network, such as a storage system, or storage array of a storage system.

According to some approaches, methods and systems described herein may be implemented with and/or on virtual systems and/or systems which emulate one or more other systems, such as a UNIX system, a *nix system, an IBM z/OS environment, a MICROSOFT WINDOWS environment, a MacOS environment, a mobile device OS environment, etc. This virtualization and/or emulation may be enhanced through the use of any hypervisor software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2A:
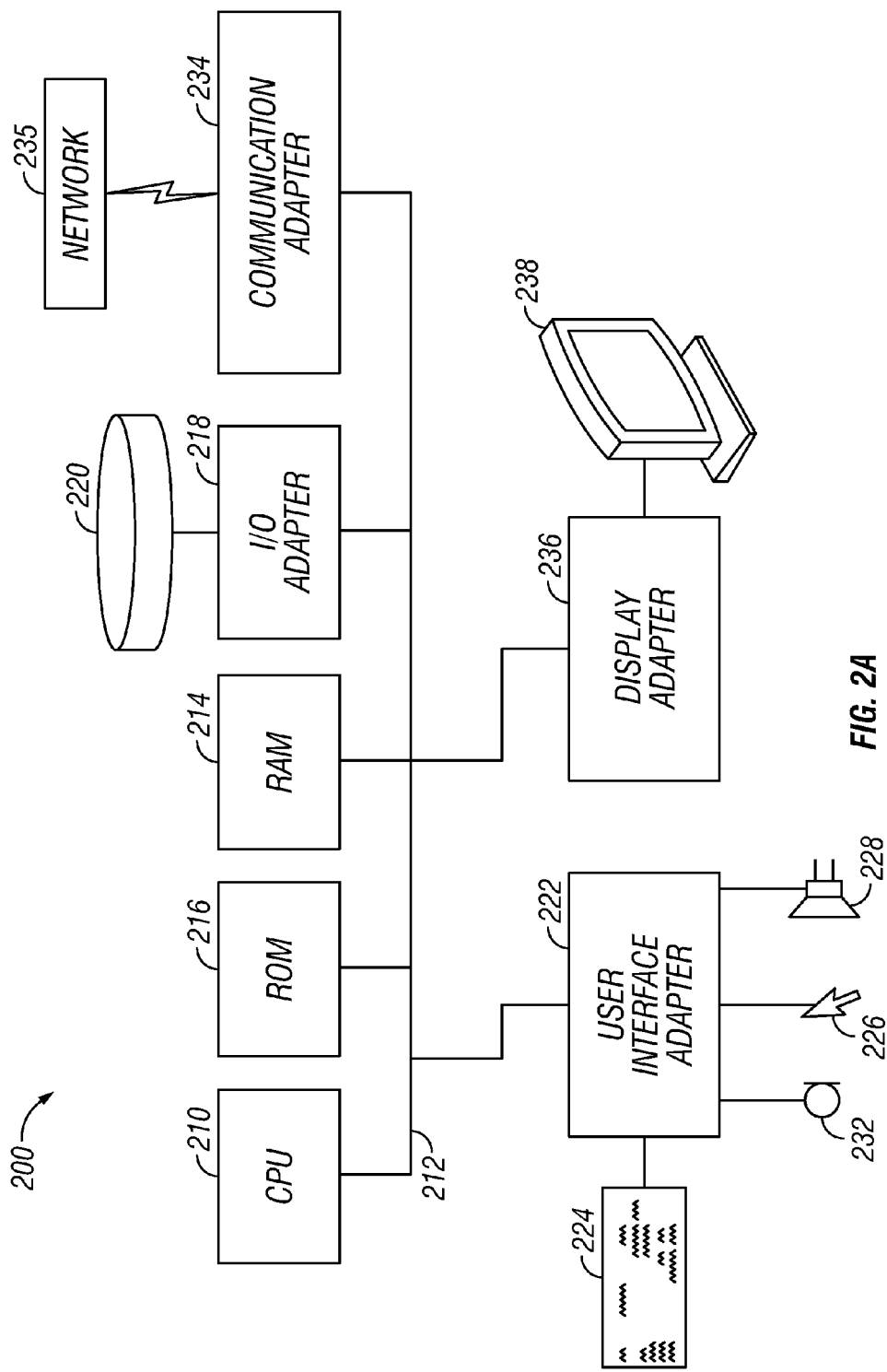
FIG. 2A is a block diagram depicting components of a device of a representative network environment, in accordance with an embodiment of the invention.

FIG. 2A is a block diagram depicting components of a device 200 of a representative network environment, such as for example, a representative hardware environment associated with a user device 116 and/or server 114 of FIG. 1, in accordance with one embodiment. This figure illustrates a typical hardware configuration of a workstation, or computing device, having at least one central processing unit 210, such as a microprocessor (processor), and a number of other units interconnected via a system bus 212.

The device 200, which may be mobile or stationary, as shown in FIG. 2, includes a Random Access Memory (RAM) 214, Read Only Memory (ROM) 216, an I/O adapter 218 for connecting peripheral devices such as disk storage units 220 to the bus 212, a user interface adapter 222 for connecting a keyboard/interface 224, a mouse/pointing device/gesture controller 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The device 200 may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The device 200 generates storage operation requests that are ultimately received and satisfied by a recipient storage end device (not shown). Specifically, a logical and/or physical hardware module of the device 200 can set and change a priority level of a storage operation request. For example, if a user of the device 200 is considered a premium user, instead of a non-premium user, wherein the premium user pays (monetarily, or some other valuation) for higher priority handling, then the premium user's storage operation requests are assigned higher priority values than a non-premium user's storage operation requests. This basic example of a service level includes a premium user being distinguished from a non-premium user. In other examples, service levels can include any number or defined categories that distinguish between users, groups, organizations, types of devices, types of communication paths, types of software applications, mobile apps, or the like.

It should be appreciated that priority values (or data attributes) can be binary, or a range of values, such as from 0 through 15, such as can be represented in hexadecimal notation, or some other valuation, such as 0 through 255, such as 8-bit ASCII code. Any coding is possible to represent a range of priority values where 0 can represent the low priority value with monotonically increasing values for higher priority values, or conversely, 15 can represent the low priority value with monotonically decreasing values for higher priority values.

Similar to providing higher priority values for storage operation requests, if the owner of a file or set of data blocks is a premium user, then a specific port of the communication adapter 234 to access the network 235 for transmitting the file or set of data blocks to the storage end device can be selected for higher priority transmission. For example, the port may have a higher bandwidth than other ports, and/or the port may have a direct communication path to the storage end device.

Another possibility is when an owner of a file, or set of data blocks is a premium user, then the user's files, or set of data blocks can be assigned higher priority than storage end device recovery operations that may be ongoing at the storage end device. Moreover, if the file or set of data blocks is an operating system file, then the file, or set of data blocks can be assigned a higher priority than all other users. Alternatively, even a premium user can obtain a higher priority value over a system file, depending on the critical importance of the system file during the continued operation of the device 200. Finally, any combination of the examples above can exist in an embodiment, such as for example, setting a higher priority value for being both a premium user whose file and port are selected according to a selected high priority value.

Figure 2B:
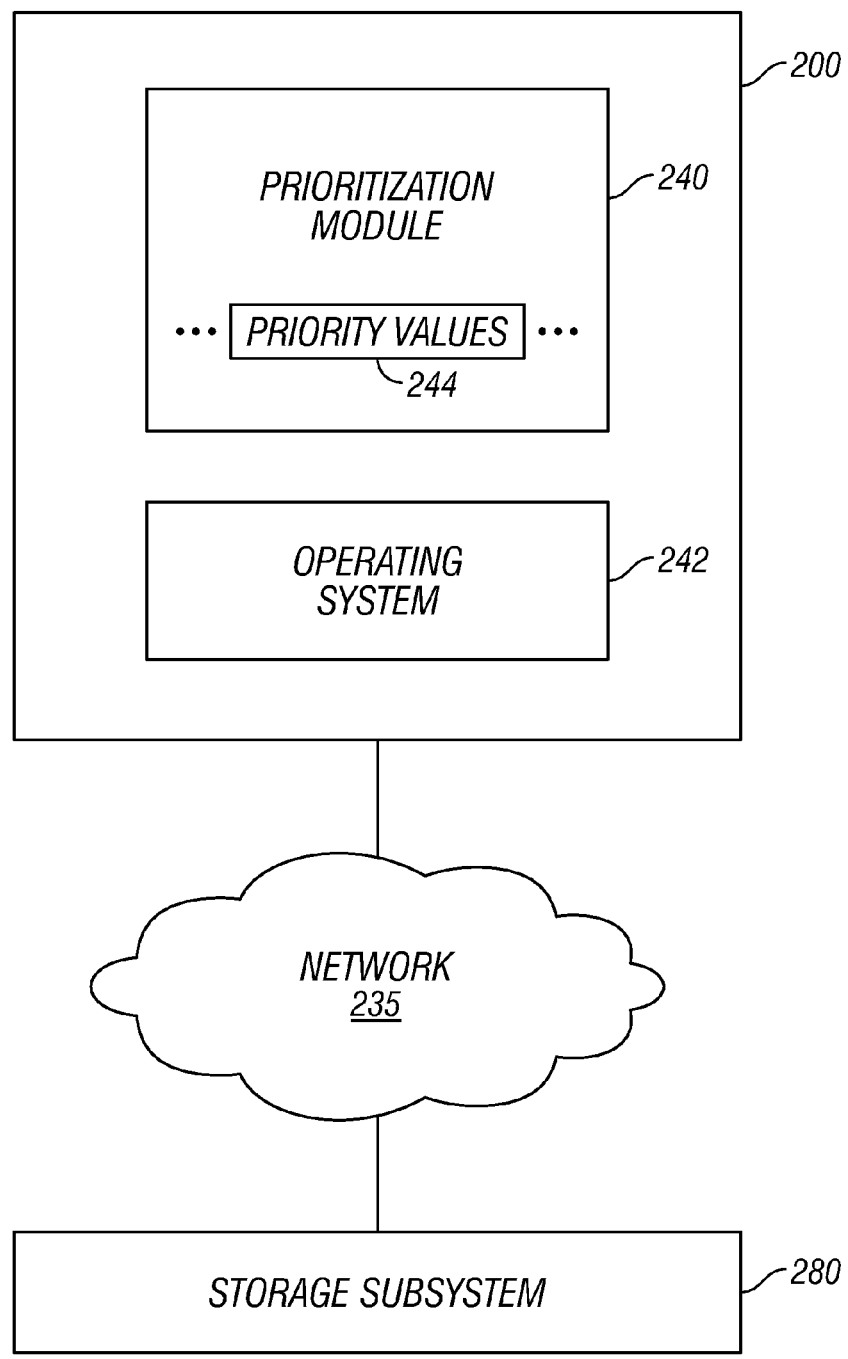
FIG. 2B depicts a block diagram that illustrates software modules operated by a device of a representative network environment, in accordance with an embodiment of the invention.

FIG. 2B depicts a block diagram that illustrates software modules operated by the device 200 of a representative network environment, in accordance with an embodiment of the invention. For example, the device 200, as an initiator, includes a prioritization module 240 including information about priority values 244. An operating system 242 operates the prioritization module 240 to set priority values relating to storage operation requests for transmission from the device 200 to the storage subsystem 280 (also referred to as the storage end device, or target, in some embodiments) via network 235. The prioritization module 240 can be implemented as a software module, and/or a programmed circuitry on hardware to provide the functionality of the embodiments described herein.

As described with respect to FIG. 2A, the priority values can be assigned according to the status of a user, such as premium or non-premium user. The prioritization module 240 distinguishes the user type and file type by checking metadata associated with a user account or file type. The metadata can be set by the operating system 242, or alternatively, perhaps by an administrator of the device 200. Specifically, for example, a metadata value can be a binary setting for a premium, or non-premium user, as is known in the art. It should be appreciated by those of ordinary skill in the art that a range of values for user type can exist beyond binary values.

The priority values 244 can be assigned to any range of values. For illustrative purposes, a metadata value can be defined as a "COMMAND_ PRIORITY" priority value identifier having a range of hexadecimal values, "0h" to "fh" (where "fh" equals "15h"). This range of sixteen priority values can be assigned as "0h" meaning a storage operation request with either no priority or a storage operation request with a vendor-specific level of scheduling importance, such as IBM Tivoli Storage Manager (TSM) designating a particular file, or set of data blocks for handling. The next value, "1h" can mean a storage operation request with the highest scheduling importance. Thereafter, subsequent priority values from "2h" to "15h" indicate decreasing importance in priority values, with "15h" meaning the lowest priority value. It should be appreciated that the values can be stored in tabular form implemented in a database, and in any format, such as a flat-file, or hierarchical, depending on the resilience of the structure including the priority values 244. Further, the priority values 244 can reside in volatile and/or non-volatile memory, as needed.

Figure 3A:
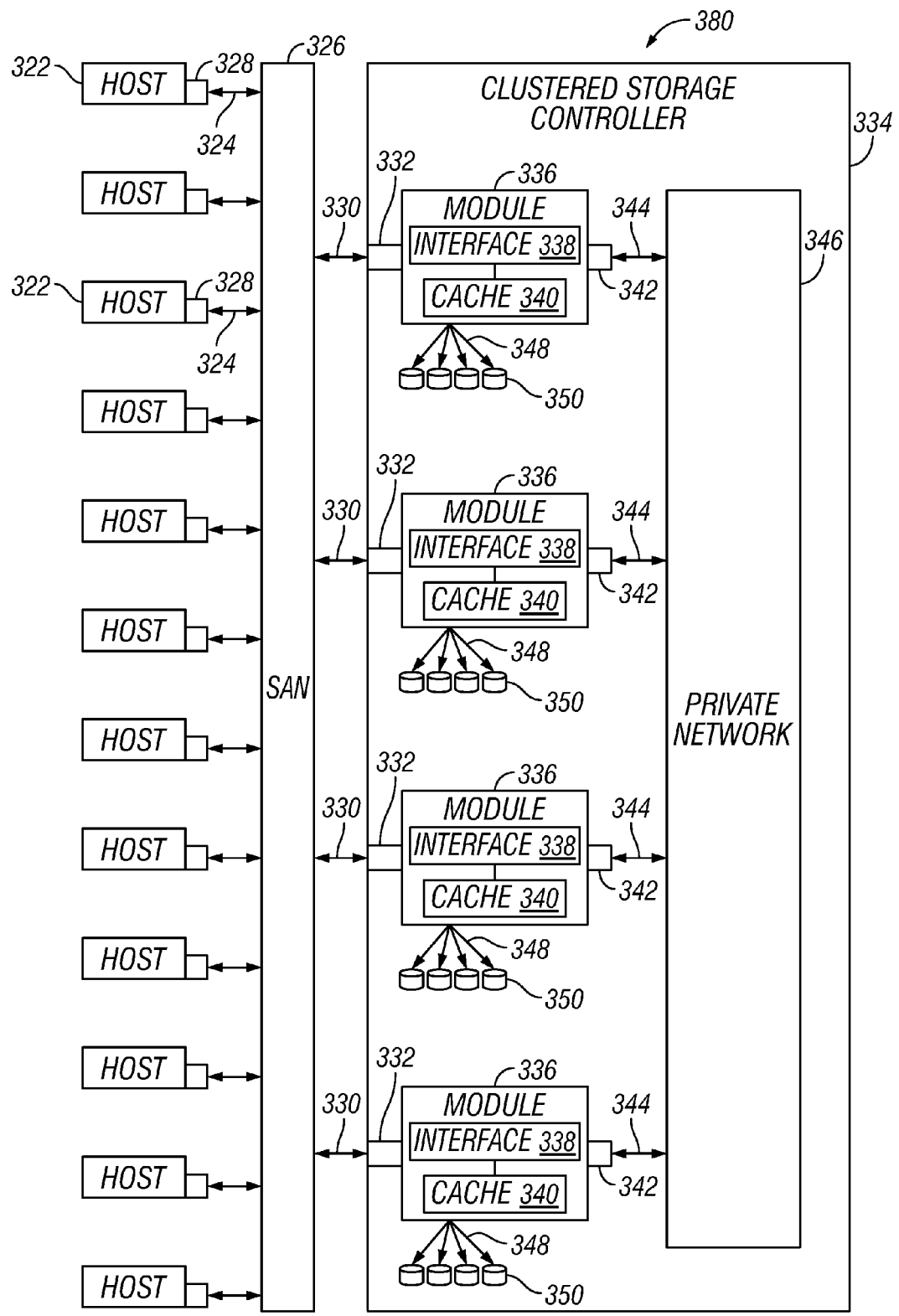
FIG. 3A is a block diagram that schematically illustrates a storage system, in accordance with an embodiment of the invention.

FIG. 3A is a block diagram that schematically illustrates a storage system, in accordance with an embodiment of the invention. The particular system (also referred to herein as a storage subsystem) described with respect to FIGS. 1 and 2B are presented to facilitate an explanation of the invention. However, as the skilled artisan will appreciate, the invention can be practiced using other computing environments, such as other storage subsystems with diverse architectures and capabilities. Storage subsystem 380 receives, from one or more host computers 322, input/output (I/O) requests, which are commands to read or write data at logical addresses on logical volumes. Any number of host computers 322 are coupled to storage subsystem 380 by any means known in the art, for example, using a network. Herein, by way of example, host computers 322 and storage subsystem 380 are assumed to be coupled by a Storage Area Network (SAN) 326 incorporating data connections 324 and Host Bus Adapters (HBAs) 328. The logical addresses specify a range of data blocks within a logical volume, each block herein being assumed by way of example to contain 512 bytes. For example, a 10 KB data record used in a data processing application on a given host computer 322 would require 20 blocks, which the given host computer might specify as being stored at a logical address comprising blocks 1,000 through 1,019 of a logical volume. Storage subsystem 380 may operate in, or as, a SAN system in one embodiment, or as a Network Attached Storage (NAS), in another embodiment.

Storage subsystem 380 comprises a clustered storage controller 334 coupled between the SAN 26 embodiment and a private network 346 using data connections 330 and 344, respectively, and incorporating adapters 332 and 342, again respectively. In some configurations, adapters 332 and 342 may comprise host bus adapters (HBAs). Clustered storage controller 334 implements clusters of storage modules 336, each of which includes an interface 338 (in communication between adapters 332 and 342), and a cache 340. Each storage module 336 is responsible for a number of storage end devices 350 by way of a data connection 348 as shown.

As described previously, each storage module 336 further comprises a given cache 340. However, it will be appreciated that the number of caches 340 used in storage subsystem 320 and in conjunction with clustered storage controller 334 may be any convenient number. While all caches 340 in storage subsystem 380 may operate in substantially the same manner and comprise substantially similar elements, this is not a requirement. Each of the caches 340 may be approximately equal in size and is assumed to be coupled, by way of example, in a one-to-one correspondence with a set of physical storage end devices 350, which may comprise disks, whether known as HDDs or SSDs. In one embodiment, physical storage devices may comprise such disks. Those skilled in the art will be able to adapt the description herein to caches of different sizes.

Each set of storage end devices 350 comprise multiple slow and/or fast access time mass storage devices, herein below assumed to be multiple hard disks or SSDs. FIG. 3A shows caches 340 coupled to respective sets of storage end devices 350. In some configurations, the sets of storage devices 350 comprise one or more hard disks or SSDs, which can have different performance characteristics. In response to an I/O command, a given cache 340, by way of example, may read or write data at addressable physical locations of a given storage end device 350. In the embodiment shown in FIG. 3B, caches 340 are able to exercise certain control functions over storage end devices 350. These control functions may alternatively be realized by hardware devices such as disk controllers (not shown), which are linked to, or communicate with, caches 340.

Each storage module 336 is operative to monitor its state, including the states of associated caches 340, and to transmit configuration information to other components of storage subsystem 380 for example, configuration changes that result in blocking intervals, or limit the rate at which I/O requests for the sets of physical storage are accepted.

Routing of commands and data from HBAs 328 to clustered storage controller 334 and to each cache 340 may be performed over a network and/or a switch. Herein, by way of example, HBAs 328 may be coupled to storage modules 336 by at least one switch (not shown) of SAN 326, which can be of any known type having a digital cross-connect function. Additionally or alternatively, HBAs 328 may be coupled to storage modules 336.

In some embodiments, data having contiguous logical addresses can be distributed among modules 336, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 350 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 350.

While such hardware is not explicitly shown for purposes of illustrative simplicity, clustered storage controller 334 may be adapted for implementation in conjunction with certain hardware, such as a rack mount system, a midplane, and/or a backplane. Indeed, private network 346 in one embodiment may be implemented using a backplane. Additional hardware such as the aforementioned switches, processors, controllers, memory devices, and the like may also be incorporated into clustered storage controller 334 and elsewhere within storage subsystem 380, again as the skilled artisan will appreciate. Further, a variety of software components, operating systems, firmware, and the like may be integrated into one storage subsystem 380.

Storage devices 350 may comprise a combination of high capacity hard disk drives and solid state disk drives (SSDs). In some embodiments each of storage devices 350 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 332 and 342 include switched fabric adapters such as Fibre Channel (FC) adapters, Internet Small Computer System Interface (iSCSI) adapters, Fibre Channel over Ethernet (FCoE) adapters and Infiniband™ adapters. Such adapters 332 and 342 can be utilized to include logic to recognize prioritization values 244 from FIG. 2B.

Figure 3B:
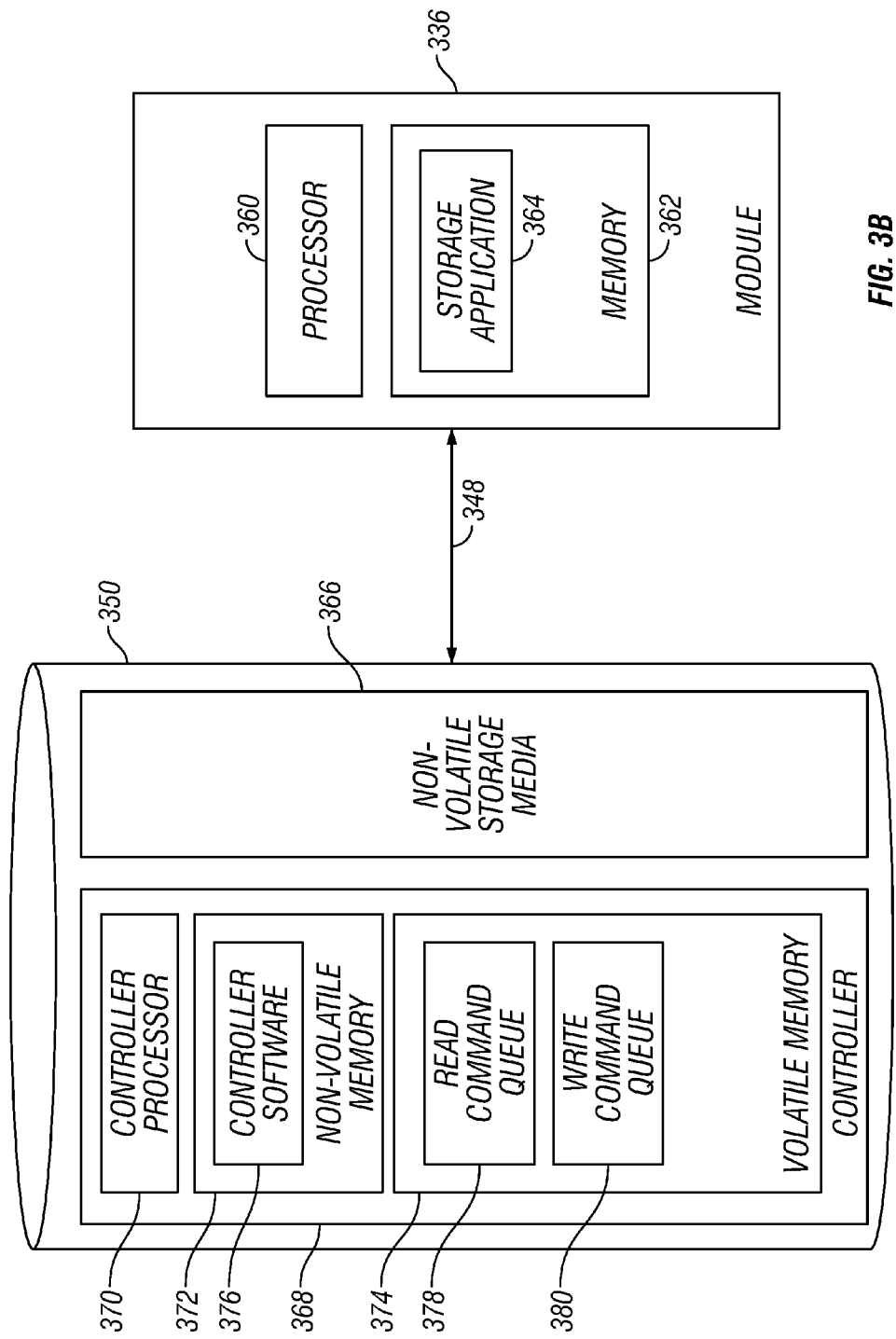
FIG. 3B is a block diagram of modules of a storage system and a storage device, in accordance with an embodiment of the invention.

FIG. 3B illustrates a block diagram of modules of a storage system and a storage device, in accordance with an embodiment of the invention. As an illustrative embodiment, a module 336 coupled to a storage device 350 can operate to manage the prioritization of storage operation requests received by the storage device 350. Module 336 comprises a processor 360 (also referred to herein as a processor) and a memory 362. In operation, processor 360 executes, from memory 362, a storage application 364 that is configured to convey input/output (I/O) requests to storage devices 350.

The storage device 350 comprises a non-volatile storage media 366 and a controller software 368. Storage media 366 comprises non-volatile devices and/or materials configured to store data. Examples of storage media 366 include platters for a hard disk drive and non-volatile random access memory (NVRAM) modules for a solid state drive (SSD).

Controller 368 comprises a controller processor 370, a non-volatile memory 372 and a volatile memory 374. Controller processor 370 is configured to execute a controller application 376 from non-volatile memory 372 that enables module 336 to access (i.e., read/write) data on storage media 366 in order to process I/O requests received from module processor 360. In embodiments where storage device 350 comprises a hard disk, processor 370 executes controller application 376 to control motors (not shown) on the storage device, and to command disk heads (not shown) to read or write data.

In an embodiment, volatile memory 374 comprises a read command queue 378 and a write command queue 380. Upon receiving a read data request, controller processor 370 is configured to store the read data request to read command queue 378, and upon receiving a write data request, the controller processor is configured to store the write data request to write command queue 380. In operation, controller processor 370 is configured to retrieve read data requests from read command queue 378, retrieve the requested data from storage media 366, and convey the requested data to processor 360. Likewise, controller processor 370 is configured to retrieve write data requests from write command queue 380, store the write request data to storage media 366, and convey a write completion acknowledgement to processor 360.

Processor 360 and/or controller processor 370 can also be configured to perform the satisfaction of prioritized storage operation requests that have assigned priority values. Processors 360 and 370 typically comprise general-purpose central processing units (CPU), which are programmed in software to carry out the function of prioritizing storage operation requests by recognizing a priority value and appropriately queuing a storage operation request to an appropriate command queue, placing higher priority requests at the head of a queue.

The software may be downloaded to module 336, or controller 368 and module 336 in electronic form, over a network, for example, or it may be provided on non-transitory tangible media, such as optical, magnetic or electronic memory media. Alternatively, some or all of the functions of processors 360 and 370 may be carried out by dedicated or programmable digital hardware components, or using a combination of hardware and software elements.

Figure 4:
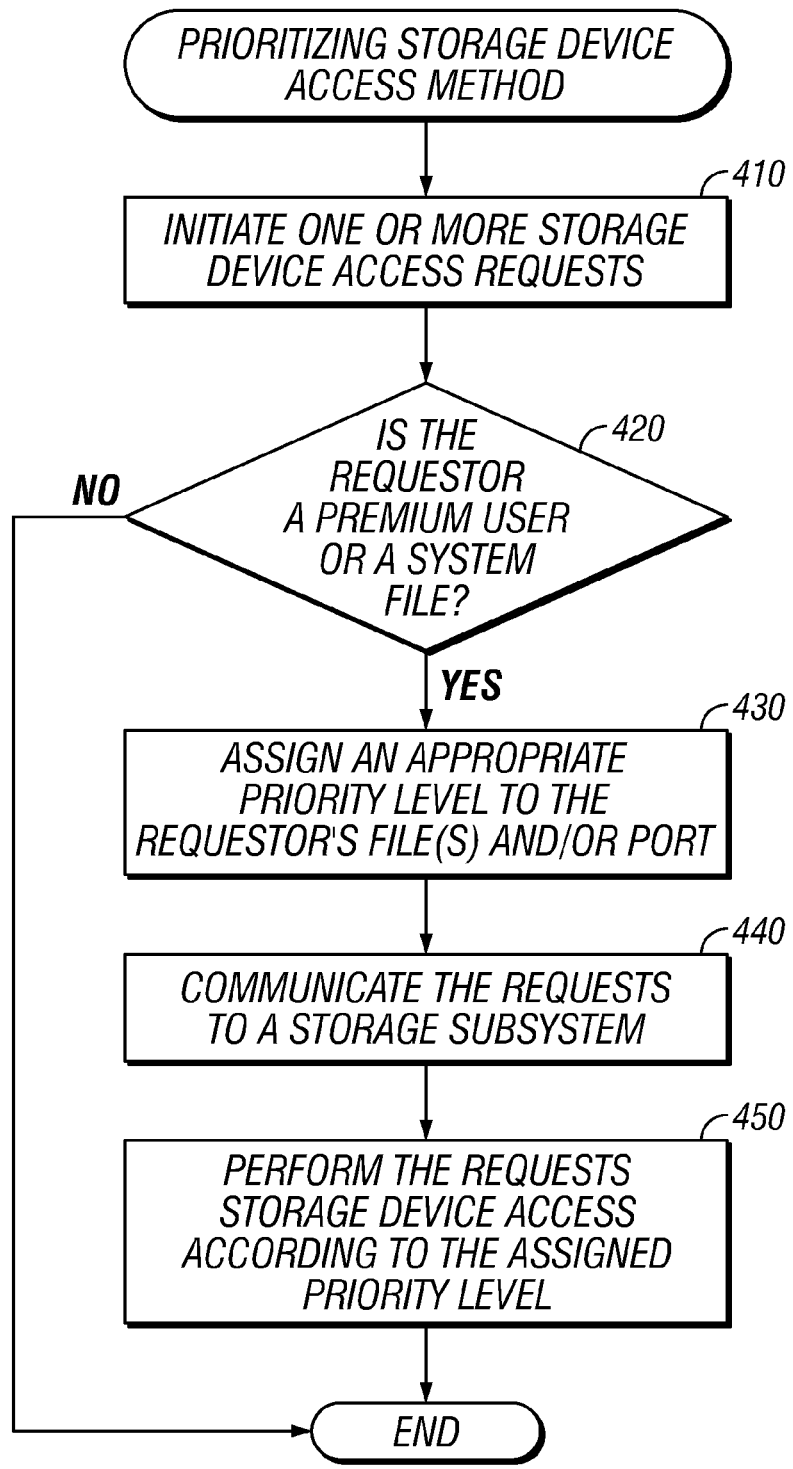
FIG. 4 is a flow diagram that schematically illustrates a method of prioritizing storage operation requests, in accordance with an embodiment of the invention.

FIG. 4 is a flow diagram that schematically illustrates a method of prioritizing storage operation requests, in accordance with an embodiment of the invention. With respect to one embodiment for premium users and system files, the prioritizing storage device access method begins by a computing device initiating one or more storage device access requests in operation 410. Multiple requests may be initiated by any number of users, software applications, or other process of the computing device. For each access request, the method includes an operation 420 to determine whether or not the requestor is a premium user or a system file. If neither is true, then the access request can end and transmission of the requests can occur without assigning a priority value. Alternatively, the method proceeds to assigning an appropriate priority level to the requestor's file (premium user and/or system file) and assign a port for transmission in operation 430. For example, a premium user request, using the hexadecimal priority value coding from the example of FIG. 2B can be assigned "1h" for the storage operation request using this data attribute and assigned a port with a direct connection to the storage device for queuing.

Thereafter, in operation 440, the computing device communicates the requests to a storage subsystem, which is in communication with the storage device. When the storage device controller recognizes the assigned priority value, then in operation 450, the storage subsystem performs the storage device access request according to the assigned priority level. Accordingly, in the example of receiving a "1h" priority designation, the requests is queued for read or write ahead of other requests having lower priority values, such as "5h." When identical priority levels are designated for some or all incoming requests to the storage subsystem, then the method may operate for example by having multiple priority queues with higher priority queues having precedence over lower priority queues. Of course, by default, one queue can operate in a similar way as long as the ordering of the requests can be made to the queue.

One of ordinary skill will also recognize that in one embodiment where all requests are assigned priority value "1h" the satisfaction of the storage operation requests operates on a first come first served behavior. Additionally, although the language of queues is used for examples, other implementations can include stacks, trees, or other abstract data type to organize data.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A computer implemented method for prioritizing storage operation requests, the method comprising:
   at least one processor creating a storage operation request, the storage operation request originated by an initiator and transmitted to a target; wherein the initiator comprises a host computer and the target comprises a storage controller of a mass data storage system being a separate entity physically located remotely from the host computer and connected thereto via a storage area network (SAN), the storage controller handling input/output (I/O) requests from a plurality of hosts to a plurality of storage devices comprised within the mass data storage system;
   at least one processor identifying and assigning, prior to the transmission of the storage operation request to the target, a priority value for the storage operation request, the priority value being associated with a request of the initiator and based upon a user purchased service level agreement (SLA) between the user of the initiator and a business operating the target; wherein the SLA changes according to an SLA priority associated with an account of the user and is determined by checking metadata of the storage operation request to determine a user type of the user, the user type comprising one of a premium user and a non-premium user;
   at least one processor receiving the storage operation request at the target, wherein the target selects at least one storage operation request from a plurality of storage operation requests based on a highest priority value; and
   at least one processor of the target satisfying the storage operation request having the highest priority value.

2. The method of claim 1, wherein at least one processor of the target satisfies a remaining plurality of storage operation requests based on a next highest priority value.

3. The method of claim 1, wherein at least one processor of the target selects a storage operation request to satisfy using operating system priorities if each of the plurality of storage operating requests is of equal priority value.

4. The method of claim 1, wherein the priority value is one of a plurality of values of a monotonically increasing or monotonically decreasing range of values, the range of values being predetermined prior to transmitting the storage operation request.

5. The method of claim 4, wherein a requestor is one of a) the user, b) a group of users, c) a software process and d) a group of software processes, the requestor further being identified with the SLA.

6. The method of claim 1, wherein the target is an end device for satisfying storage operation requests.

7. The method of claim 6, wherein the end device is one of the plurality of storage devices of the mass data storage system, the end device being one of a) an electro-magnetic storage device, b) an optical storage device, c) a solid state storage device, and d) an aggregated storage device.

8. A computer system for prioritizing storage operation requests, the computer system comprising:
   one or more processors, one or more computer-readable memories, one or more computer-readable storage devices, and program instructions stored on at least one of the one or more storage devices for execution by at least one of the one or more processors via at least one of the one or more memories, the program instructions comprising:
   program instructions creating a storage operation request, the storage operation request originated by an initiator and transmitted to a target; wherein the initiator comprises a host computer and the target comprises a storage controller of a mass data storage system being a separate entity physically located remotely from the host computer and connected thereto via a storage area network (SAN), the storage controller handling input/output (I/O) requests from a plurality of hosts to a plurality of storage devices comprised within the mass data storage system;
   program instructions identifying and assigning, prior to the transmission of the storage operation request to the target, a priority value for the storage operation request, the priority value being associated with a request of the initiator and based upon a user purchased service level agreement (SLA) between the user of the initiator and a business operating the target; wherein the SLA changes according to an SLA priority associated with an account of the user and is determined by checking metadata of the storage operation request to determine a user type of the user, the user type comprising one of a premium user and a non-premium user;
   program instructions receiving the storage operation request at the target, wherein the target selects at least one storage operation request from a plurality of storage operation requests based on a highest priority value; and
   program instructions of the target satisfying the storage operation request having the highest priority value.

9. The computer system of claim 8, wherein at least one processor of the target satisfies a remaining plurality of storage operation requests based on a next highest priority value.

10. The computer system of claim 8, wherein at least one processor of the target selects a storage operation request to satisfy using operating system priorities if each of the plurality of storage operating requests is of equal priority value.

11. The computer system of claim 8, wherein the priority value is one of a plurality of values of a monotonically increasing or monotonically decreasing range of values, the range of values being predetermined prior to transmitting the storage operation request.

12. The computer system of claim 8, wherein the target is an end device for satisfying storage operation requests.

13. The computer system of claim 12, wherein the end device is one of the plurality of storage devices of the mass data storage system, the end device being one of a) an electro-magnetic storage device, b) an optical storage device, c) a solid state storage device, and d) an aggregated storage device.

14. A computer program product for prioritizing storage operation requests, the computer program product comprising:
one or more computer-readable storage devices and program instructions stored on at least one of the one or more storage systems, the program instructions comprising:
program instructions to create a storage operation request, the storage operation request originated by an initiator and transmitted to a target; wherein the initiator comprises a host computer and the target comprises a storage controller of a mass data storage system being a separate entity physically located remotely from the host computer and connected thereto via a storage area network (SAN), the storage controller handling input/output (I/O) requests from a plurality of hosts to a plurality of storage devices comprised within the mass data storage system;
program instructions to identify and assign, prior to the transmission of the storage operation request to the target, a priority value for the storage operation request, the priority value being associated with a request of the initiator and based upon a user purchased service level agreement (SLA) between the user of the initiator and a business operating the target; wherein the SLA changes according to an SLA priority associated with an account of the user and is determined by checking metadata of the storage operation request to determine a user type of the user, the user type comprising one of a premium user and a non-premium user;
program instructions to receive the storage operation request at the target, wherein the target selects at least one storage operation request from a plurality of storage operation requests based on a highest priority value; and
program instructions of the target satisfying the storage operation request having the highest priority value.

15. The computer program product of claim 14, wherein the target satisfies a remaining plurality of storage operation requests based on a next highest priority value.

16. The computer program product of claim 14, wherein at least one processor of the target selects a storage operation request to satisfy using operating system priorities if each of the plurality of storage operating requests is of equal priority value.

17. The computer program product of claim 14, wherein the priority value is one of a plurality of values of a monotonically increasing or monotonically decreasing range of values, the range of values being predetermined prior to transmitting the storage operation request.

18. The computer program product of claim 14, wherein the target is an end device for satisfying storage operation requests.

19. The computer program product of claim 18, wherein the end device comprises one or more of a Hard Disk Drive, a Solid State drive, a Random Access Memory (RAM), an Electrically Erasable Programmable Read Only Memory (EEPROM), an EPROM Erasable Programmable Read Only Memory (EPROM), or a flash memory.

* * * * *